Sept. 29, 1970     J. A. GOUGH     3,530,592
TRAINING AID
Filed April 24, 1969
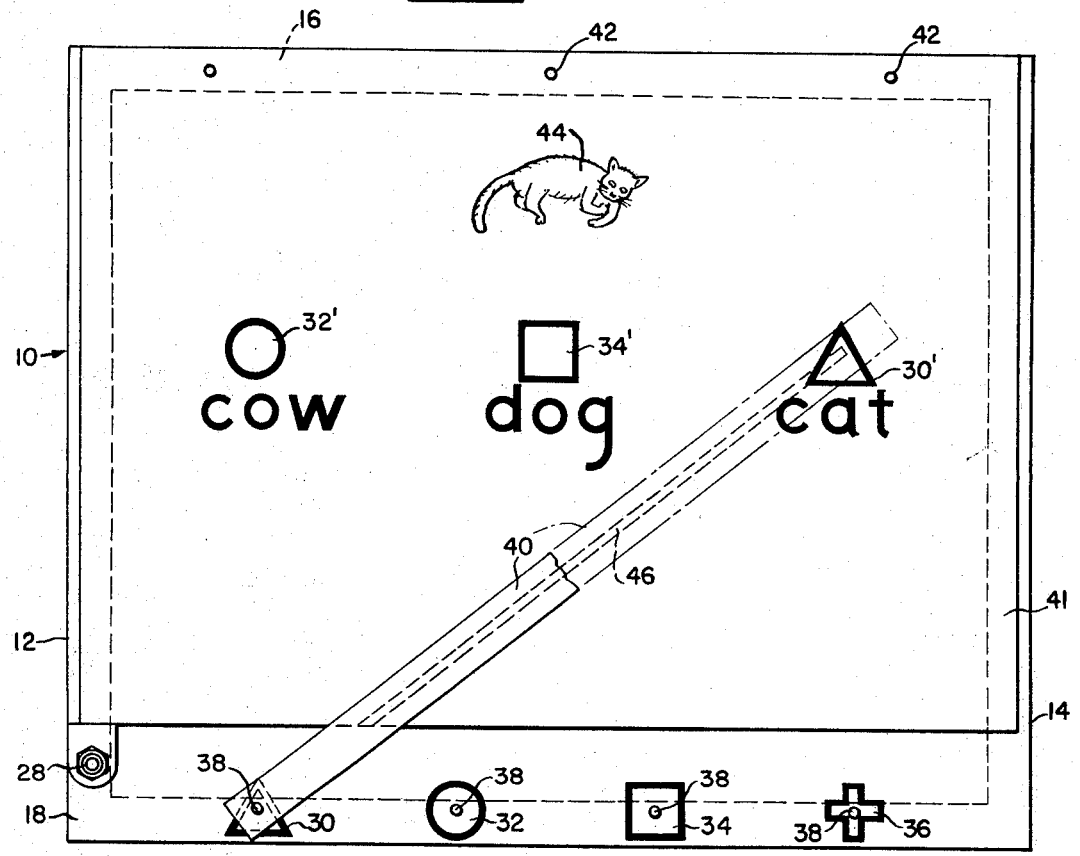
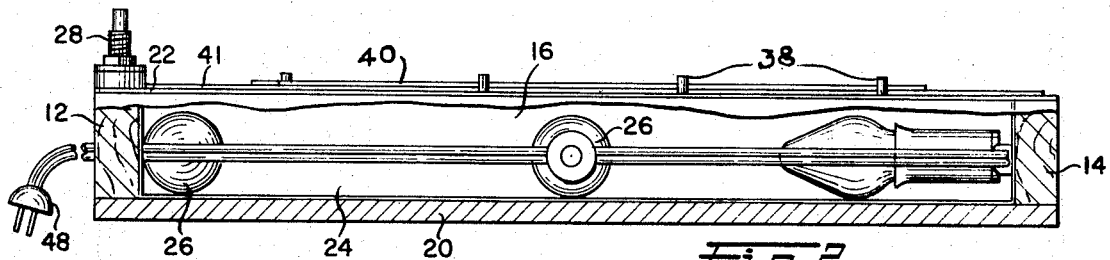
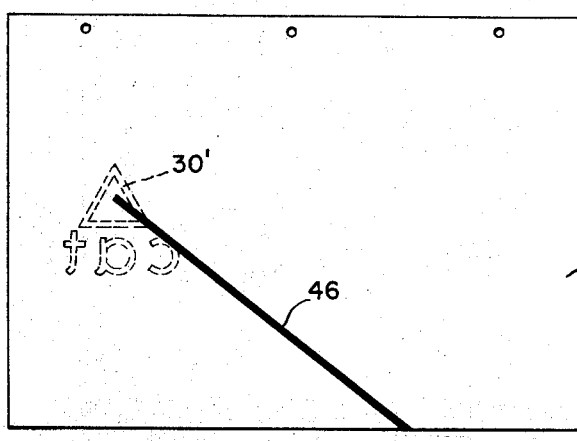
INVENTORS
JOHN A. GOUGH
BY
*Scrivener Parker Scrivener & Clarke*
ATTORNEYS

United States Patent Office 3,530,592
Patented Sept. 29, 1970

3,530,592
TRAINING AID
John A. Gough, Rte. 2, Nottingham, Pa. 19362
Filed Apr. 24, 1969, Ser. No. 818,929
Int. Cl. G09b 7/10
U.S. Cl. 35—9                                    4 Claims

ABSTRACT OF THE DISCLOSURE

A hidden answer training aid including an opaque strip which is placed on a card to designate the selected one of several possible solutions. A normally hidden line remains obscured by the opaque strip when the card is subjected to illumination, but if the learner has selected incorrectly, he observes simultaneously with his selection the correct solution as indicated by the normally hidden line after it has been rendered visible by the illumination.

---

This invention relates to educational devices and more particularly to a training aid of the hidden answer variety specially adapted to stimulate the learning processes of young children.

The device of the present invention is similar in several respects to the device shown in my prior Pat. No. 2,932,908. In the earlier device a learner stretched rubber bands or drew a line between points on a transparent overlay beneath which was a card bearing problems and randomly placed solutions. The learner stretched the bands or drew the lines between the problems and the solutions which he considered correct. Thereafter, the overlay was raised and the card was turned over so that normally hidden lines extending between the problems and the correct solutions were visible and when the card was placed in the frame and the overlay was replaced over the card the learner could see immediately whether or not his solutions were correct by merely observing the congruence or lack thereof of the rubber bands or drawn lines with respect to the printed lines on the back of the card. The patented arrangement is satisfactory, but it has been found that more effective results can be achieved if both the problem and hidden answer lines are rendered visible to the learner at the same time and it is the broad object of the invention to eliminate the problem of turning over the card to check the solution by applying a hidden answer line to the card in such a manner that it and the selected solution are simultaneously rendered visible to the eye when a predetermined type or degree of illumination is applied to the card.

Briefly the invention comprises an improved hidden answer type of training aid, which includes the use of an opaque strip which the learner places on the card to designate the selected one of several possible solutions. If he has selected correctly, the normally hidden line remains obscured by the opaque strip when the card is subjected to illumination, but if the learner has selected incorrectly, then he observes simultaneously with his selection the correct solution as indicated by the normally hidden line after it has been rendered visible by the illumination.

Referring now to the drawings:

FIG. 1 is a top plan view of the device of the invention;

FIG. 2 is a side view partly in elevation and partly in cross-section of the device of the invention; and FIG. 3 is a reduced view of the obverse side of a card employed as a part of the invention.

Referring now to the drawings the numeral 10 designates a rectangular frame having end parts 12, 14 and upper and lower side parts 16, 18, which define with an opaque bottom 20 and a light transmitting cover panel 22 a light compartment 24 containing bulbs 26 controlled by a switch 28. The upper side of the part 18 of the frame is substantially wider than the other parts and carries on it a plurality of symbols which may be a series of geometric figures as designated by the numerals 30, 32, 34 and 36. In the center of each of the figures is a vertical pin 38 which is adapted to cooperate with an opening at one end of an opaque strip 40 which is sufficiently long so that it may be swung about any pin 38 and overlie any one of a plurality of geometric figures, such as those indicated by the numerals 32', 34' and 30' on a movable translucent card 41 and which match at least some of the previously mentioned geometric figures 30 through 36 on the part 18 of the frame 10.

The card 41 which may have a series of openings along one edge to engage with a series of locating pins 42 carried by the part 16 of the frame 10, has printed thereon a typical problem and multiple choice solutions and for purposes of illustration the particular problem shown is for a young child to identify an illustrated animal such as the cat 44 and then to determine which of the three possible solutions, designated "cow," "dog" or "cat" and appearing adjacent each of the respective figures 32', 34', 30', is the proper word for the animal which is illustrated. Printed on the obverse side of the card is an opaque line 46 which extends from the symbol, in this case 30', adjacent the correct solution towards the matching symbol 30 on the frame 10.

In the event that the child determines that "cat" is the correct word for the animal 44, he places the hole in the end of the opaque strip over the pin of that geometrical figure or symbol on the bottom part of the frame which matches the geometrical figure adjacent the selected solution. He then swings the strip 40 until it overlies the matched figure 30' on the card and depresses the electric switch 28 to turn on the bulbs to cast a light upwardly through the light transmitting panel 22 and the translucent card 41 and because the learner has selected the correct solution he will see only the single opaque line defined by the strip and will know that he has selected the correct answer.

On the other hand, should the learner have decided that the correct spelling of the animal is "dog" and he were then to engage the end of the strip 40 with the pin 38 in the square figure 34 on the side of the frame and swing the strip to overlie the matching square 34' on the card, when he now depresses the switch 28 he will observe two opaque lines, one being the correct solution line 46 printed on the back of the card and the other being the line defined by the opaque strip 40. Thus the learner simultaneously will observe that not only is his selected solution incorrect, but at the same time it will be instantly apparent to him what the actual correct solution is.

It is believed that the structure and mode of operation of the present invention should be obvious from the foregoing description. It should be noted, however, that if desired, the card 41 may be provided only with an opaque line 46 on its obverse side and a teacher may devise any problems which are appropriate for the circumstances. The teacher would apply two or more symbols to the card, which can be readily done by free-hand sketch, matching symbols on the frame, making certain that the proper matching symbol is in substantial alignment with the printed line on the back of the card so that a single line is apparent to the learner when he has selected the correct answer as explained above.

It will be understood that the bulbs may be energized by batteries or by house current by means of a plug 48.

What is claimed is:

1. An educational device comprising a frame, a plurality of symbols carried by said frame, a card cooperating with said frame and bearing on the upper face thereof a plurality of symbols at least some of which match the symbols carried by said frame, a normally hidden line on said card arranged to extend from one symbol towards the position of a matching symbol on said frame, said line being arranged on said card so as to be visible only when said card is subjected to pre-determined illumination.

2. The educational device of claim 1 wherein said card includes on its upper face a problem and a plurality of possible solutions to said problem, one associated with each of said symbols and at least one of which is a correct solution to the problem, said hidden line on said card being arranged to extend from the symbol associated with the correct solution toward the position of a matching symbol on said frame.

3. The educational device of claim 2 wherein said card is translucent and said line is on the back of said card, said frame including a light compartment below said card, illumination means within said compartment, and switch means connected to said illumination means for controlling the same.

4. The educational device of claim 1 including a separate opaque strip overlying said card and having a length sufficient to extend between any pair of matching symbols on said frame and on said card.

References Cited
UNITED STATES PATENTS

| | | | |
|---|---|---|---|
| 2,838,847 | 6/1958 | Zalkind | 35—9 |
| 2,092,577 | 9/1937 | Hornung | 35—9 |
| 2,932,908 | 4/1960 | Gough | 35—9 X |
| 3,327,406 | 6/1967 | Baker | 35—9 |

WILLIAM H. GRIEB, Primary Examiner